United States Patent [19]

Forster et al.

[11] 4,181,942
[45] Jan. 1, 1980

[54] PROGRAM BRANCHING METHOD AND APPARATUS

[75] Inventors: Richard G. Forster; John K. Howard, both of San Jose, Calif.

[73] Assignee: International Business Machines Corporation, Armonk, N.Y.

[21] Appl. No.: 892,243

[22] Filed: Mar. 31, 1978

[51] Int. Cl.² .................................................. G06F 9/12
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,058,658 | 10/1962 | Schmierer | 364/200 |
| 3,239,820 | 3/1966 | Logan | 364/200 |
| 3,292,153 | 12/1966 | Barton | 364/200 |
| 3,292,155 | 12/1966 | Neilson | 364/200 |
| 3,297,998 | 1/1967 | Klein | 364/200 |
| 3,366,929 | 1/1968 | Mullery | 364/200 |
| 3,490,005 | 1/1970 | Anderson | 364/200 |
| 3,573,853 | 4/1971 | Watson | 364/200 |
| 3,577,189 | 5/1971 | Cocke | 364/200 |
| 3,577,190 | 5/1971 | Cocke | 364/200 |
| 3,665,402 | 5/1972 | Greenspan | 364/200 |
| 3,713,108 | 1/1973 | Edstrom | 364/200 |
| 3,728,686 | 4/1973 | Weisbecker | 364/200 |
| 3,728,689 | 4/1973 | Edwards | 364/200 |
| 3,737,867 | 6/1973 | Cavin | 364/200 |
| 3,793,631 | 2/1974 | Silverstein | 364/200 |
| 3,875,565 | 4/1975 | Endoy | 364/200 |
| 3,958,227 | 5/1976 | Evans | 364/200 |
| 3,980,991 | 9/1976 | Mercurio | 364/200 |

*Primary Examiner*—James D. Thomas
*Attorney, Agent, or Firm*—Otto Schmid, Jr.

[57] ABSTRACT

A special branch instruction used in a computing system serves as a conditional branch or as an unconditional branch as determined by the state of an internal register. This special branch instruction is used for conditional branching within or at the end of a program loop and for unconditional branching outside of such a loop.

7 Claims, 10 Drawing Figures

OP CODE

| BIT NUMBER 0 1 2 3 | NUMBER DESIGNATION | OP NAME | OP FUNCTION |
|---|---|---|---|
| 0 0 0 0 | 0 | LDA | LOAD ACC |
| 0 0 0 1 | 1 | AND | AND |
| 0 0 1 0 | 2 | ORA | OR |
| 0 0 1 1 | 3 | OIA | NOR |
| 0 1 0 0 | 4 | EOR | EXCLUSIVE |
| 0 1 0 1 | 5 | EBR | EX-OR & BRANCH |
| 0 1 1 0 | 6 | ADD | ADD |
| 0 1 1 1 | 7 | LBR | LOAD ACC & BR |
| 1 0 0 0 | 8 | LRI | LOAD REG IMM |
| 1 0 0 1 | 9 | STA | STORE |
| 1 0 1 0 | 10 | RST | RESET |
| 1 0 1 1 | 11 | SET | SET |
| 1 1 j k * | 12 | UBR | UNCOND BR |

* j AND k ARE THE HIGH ORDER BRANCH ADDRESS BITS

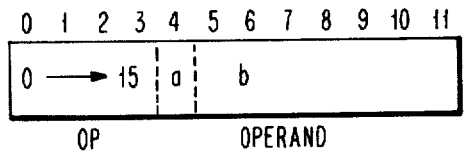
FIG. 3 — GENERAL FORMAT SHORT INSTRUCTIONS
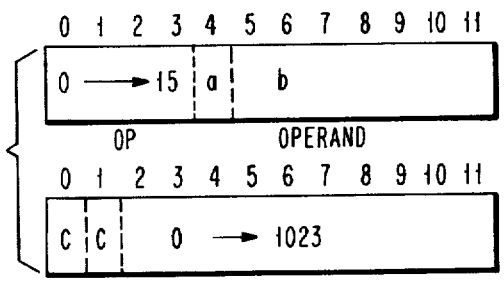
FIG. 4 — LONG INSTRUCTIONS FIRST WORD / SECOND WORD
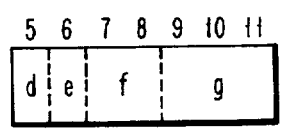
FIG. 5 — OPERAND FIELD
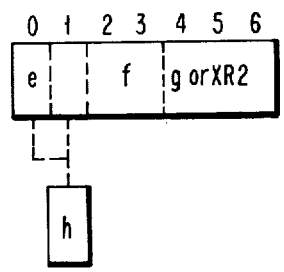
FIG. 6 — RAS ADDRESS
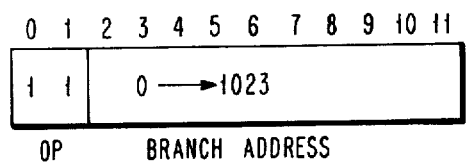
FIG. 7 — BRANCH UBR

PROGRAM BRANCHING METHOD AND APPARATUS

DESCRIPTION

Background of the Invention

The present invention relates to improved signal processing methods and apparatus, and more particularly to apparatus and a method in a digital computer which allows improved program branching.

There has been a recent increase in the use of microcomputers to perform many highly specialized uses. One reason for this increase is the development of a microcomputer containing a microprocessor, a program store, a random access storage and input/output device controllers on one monolithic integrated chip. With an on-chip program store of fixed size, efficient use of instruction words is vital.

Direct addressing of such a microcomputer requires that each branch instruction contains the entire next instruction address, which requires a large word size for large addressing range. A two-word instruction is required for conditional branching, however, a one-word instruction can be used for unconditional branching operations.

When operating in a program loop, the instructions must set up an index register and then execute a conditional branch at the end of each loop. This branch tests the state of the index register, and conditionally branches back to the top of the loop. In a typical application, the two-word branch instruction occurs a substantial number of times in the instruction store. The availability of a one-word branch instruction usable for these applications would result in the saving of a substantial number of storage words.

It is therefore the principal object of the present invention to provide a one-word unconditional branch instruction that can be executed as a conditional branch instruction under certain machine conditions.

SUMMARY OF THE INVENTION

Briefly, according to the present invention, there is provided a one-word special branch instruction which serves as a conditional branch or as an unconditional branch as determined by the state of an internal register. The special branch instruction is used for conditional branching within or at the end of a program loop and for unconditional branching outside of such a loop.

The special branch method comprises detecting the occurrence in a first register means of a first state; unconditionally branching to an alternate sequence of instructions specified by the branch address in response to the occurrence in the first register means of the specified first state; detecting, in response to the absence of the occurrence in the first register of the specified first state, the occurrence in a second register means of a zero state; branching to the sequence of instructions specified by the branch address and decrementing the second register means in response to detecting the absence of the occurrence in the second register means of a zero state; and setting the first register means to the first state and executing the next sequential instruction in the original instruction sequence in response to detecting a zero state in the second register means.

The special branch instruction execution apparatus comprises first register means for specifying the branch mode, second register means for specifying the number of passes through the loop and instruction execution means for executing the branch instruction, responsive to the first register means specifying a first mode for unconditionally branching to the instruction specified branch address responsive to the first register means specifying a second mode and to the second register not equaling zero for decrementing the second register and branching to the specified branch address, and responsive to the second mode and to the second register means equaling zero for setting the first register means to the first mode and executing the next sequential instruction.

BRIEF DESCRIPTION OF THE DRAWINGS

FIG. 3 is a diagram showing the general instruction format of the short instructions for the microcomputer of FIG. 1;

FIG. 4 is a diagram showing the instruction format of the long instructions for the microcomputer of FIG. 1;

FIG. 5 is a diagram showing the general format of the OPERAND field for the microcomputer instructions when random access storage (RAS) addressing is specified;

FIG. 6 is a diagram showing the address formation for the RAS of the microcomputer;

FIG. 7 is a diagram showing the format of the special unconditional branch instruction (UBR) for the microcomputer of FIG. 1;

DESCRIPTION OF THE PREFERRED EMBODIMENT

The branching method and apparatus of the present invention may be employed in any suitable stored program computer in which it is required to perform a branching operation. However, by way of example, the invention is describes as specifically embodied in the microcomputer shown in FIG. 1.

Figure 1:
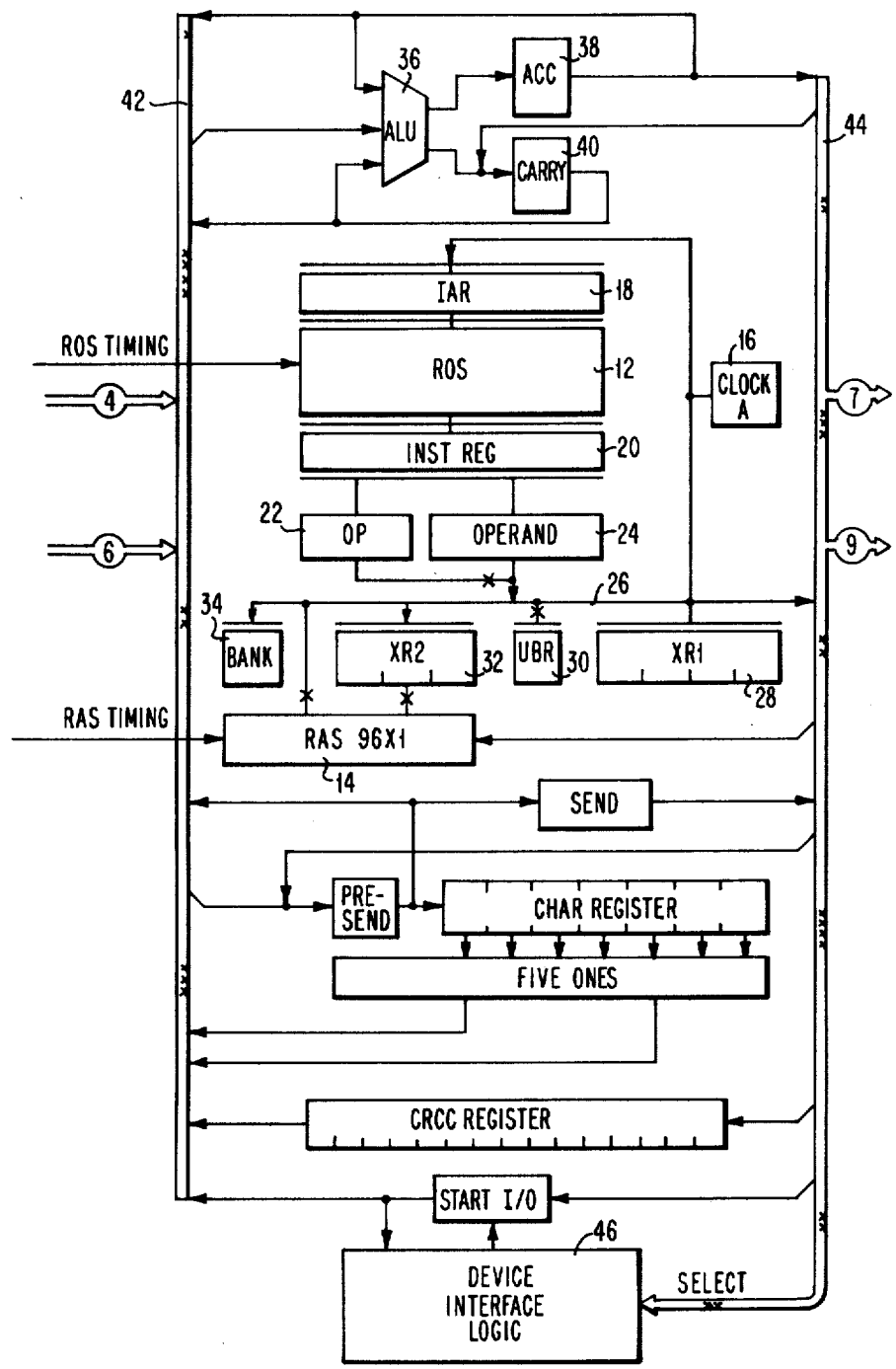
FIG. 1 is a schematic block diagram of a single-chip microcomputer in which the invention is particularly useful.

The microcomputer is utilized along with a clock chip and a utilization device which, in a specific system, is a communication loop. The details of the interaction between the microcomputer and the communication loop are not disclosed since they are not necessary to an understanding of the invention. Several signals are presented to input bus 42 including four communications oriented signals and six device oriented signals. Each of these input signals is latched and presented to the processor as a source. Several signals are presented to output bus 44 including seven communications oriented signals and nine device oriented signals. Each of these output signals is latched and presented to the external system as a destination. FIG. 1 is a block diagram of the major parts of a microcomputer utilized in the present invention. The microcomputer includes a read only storage (ROS) 12 and a random access storage (RAS)

14. The ROS 12 contains a large number, 1024, for example, of instruction words of 12 bits per word, for example, and is used to store the program which operates the system. The RAS 14 contains, for example, 96 read-write storage cells of one bit each, for example, organized as three pages, each 32 bits long.

Figure 8:
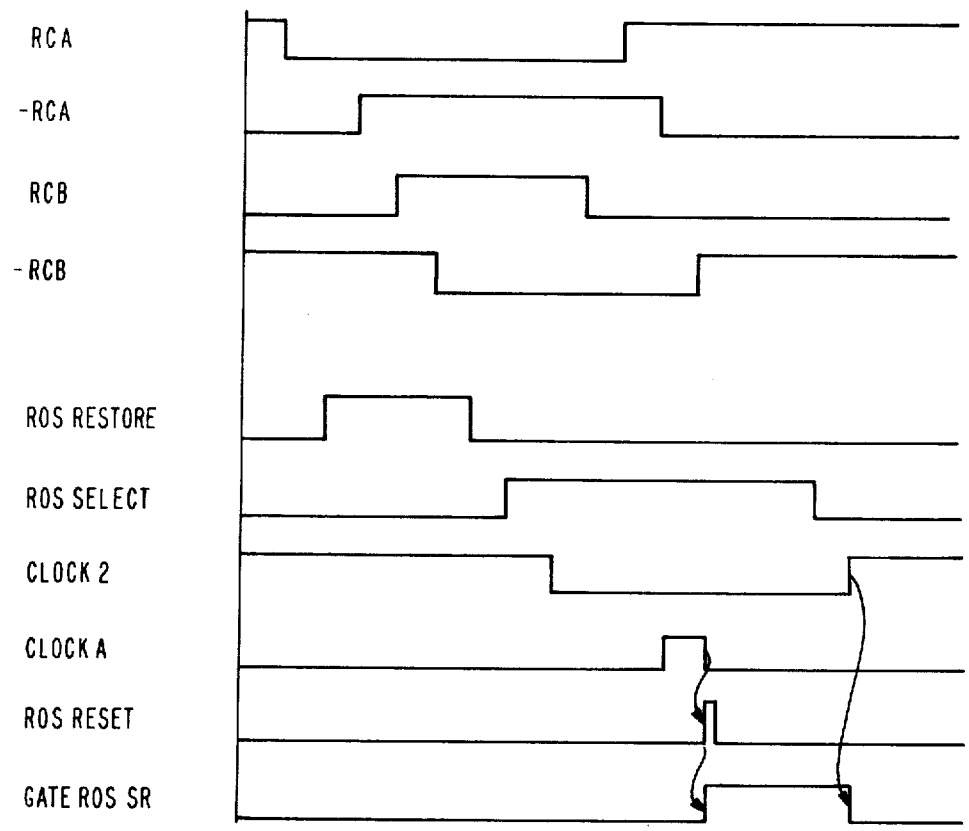
FIG. 8 is a timing diagram which illustrates the relative timings of the microcomputer components.
Figure 9:
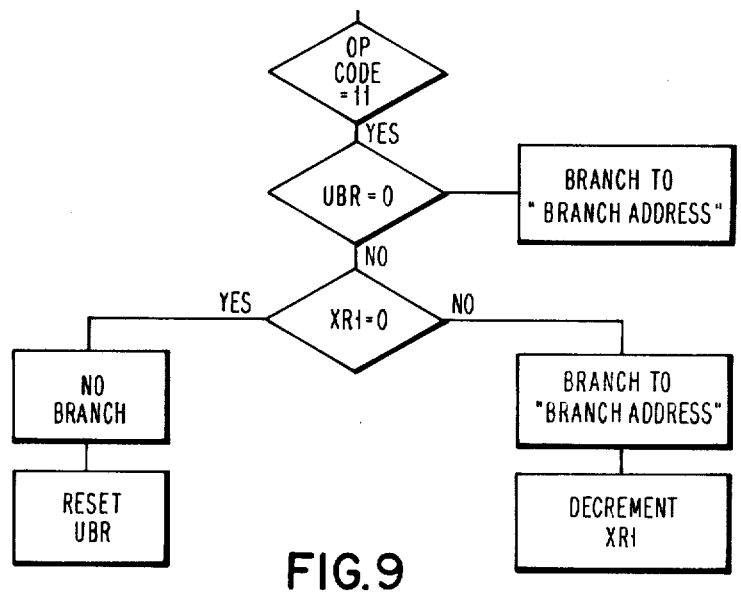
FIG. 9 is a flow chart which defines the steps taken to execute the UBR instruction.

Basic clock control of the microcomputer is supplied by a clock chip (not shown). These clock signals (See FIG. 8) comprise CLOCK 2 and timing signals for ROS 12 and RAS 14 (RCA and RCB). CLOCK 2 is used to increment the instruction counter. One instruction is executed for each CLOCK 2 cycle. The signals RCA and RCB provide the signals needed to continuously operate RAS 14 on the chip, whereas the signals ROS SELECT and ROS RESTORE provide the signals needed to operate ROS 12 on the processor chip. CLOCK A 16 is an on-chip clock signal and all values required for instruction execution must be available at the fall of the CLOCK A signal. CLOCK A is used to gate results of the current instruction into the internal registers and shift registers. The ROS timing signals control the addressing of the program instructions specified by the address in Instruction Address Register (IAR) 18. The specified instruction is read from ROS into instruction register 20, and the operation to be performed is decoded by the part of the instruction (See FIGS. 3 and 4) gated to Op register means 22 for that purpose. Op register means 22 includes logic circuits for decoding the Op code and controls to execute the instruction. The Op code is decoded at the fall of CLOCK A so all data required for the instruction to be executed must be present at this time. The remainder of the instruction is gated to OPERAND register 24 where this part of the instruction is stored. A bus 26 is provided to transfer under control of Op register 22 data from register 24 to RAS 14 and a plurality of internal register means, including Index Register 1 means (XR1) 28, Unconditional Branch Register means (UBR) 30, Index Register 2 means (XR2) 32 and Bank Register (BANK) 34. The small "x" in the drawing means selective gating derived from the control bits from the Op Code and/or instruction execution.

Index Register 1 means 28 is a 4-bit feedback shift register counter in a specific embodiment. It is incremented each time an unconditional branch instruction operation is executed with UBR register means 1. The XR1 is loaded with ROS bits 8, 9, 10, 11 by the index I load line which results from proper decoding of the LRI op. The all zero condition is decoded and is used as a condition for not branching in the branch instructions.

The UBR register means 30 is a one bit register which in a specific embodiment comprises a latch. This register is used to modify the execution of the unconditional branch operation, to allow its use in controlling loops. The UBR register, when set, prevents an unconditional branch if XRI is zero.

Index Register 2 means 32 in a specific embodiment is a 3-bit binary counter. It is incremented each time a RAS address with indexing and incrementing (bits 5 and 11) is formed. The XR2 register is reset with an LRI operation with ROS bit 4 zero. The outputs of this register are used in forming the RAS address when indexing is specified.

The data path within the processor includes an arithmetic and logic unit (ALU) 36, the output of which is directed to an accumulator (ACC) 38 and a CARRY latch 40. Data from RAS 14 can be transferred by way of BUS IN 42 to ALU 36 and the output of accumulator 38 may be directed to BUS OUT 44 for transfer to an association I/O device over device interface logic 46 or one of the other outputs from bus 44.

BUS IN 42 comprises logic to gate the various sources onto a common line called -GATED DATA. A BUS IN line is created by the selective gating of -GATED DATA from the BUS IN logic or of data from RAS 14. The choice is determined by ROS bit 4 which is "0" for RAS sources and "1" for special purpose register or input sources. Source destination decode logic is provided to decode ROS bits 6–11 into individual lines for use in gating both sources and destinations. The BUS IN line along the ACC and CARRY lines are the data inputs to ALU 36. The Op Code bits 0–4 selectively gate the appropriate ALU Output via a large OR circuit to the data input of ACC and via the Carry Out line to the data input of the CARRY latch 40, which is one of the BUS OUT Latches. This logic serves all of the source Ops.

The microcomputer is a one address machine with a single bit accumulator as the implied location of the second operand and result operand. The instruction set (see FIG. 2) has four connective operations (AND, ORA, OIA, EOR), two move operations (LOAD ACC, STORE ACC), one load immediate operation (LRI), one arithmetic operation (ADD), and three branch operations (UNCOND-BR, LOAD & BR, EX-OR & BR), and two set operations (SET, RESET). The conditional branch operations can branch on accumulator One, Zero or unconditionally. The conditional branch instructions are two ROS words long (see FIG. 4), while all other instructions are one ROS word long (see FIG. 3). The function of the unconditional branch instruction (UBR) can be modified by an internal register, UBR register 30 to become a test and branch on index register 1 28 as will be more fully described below.

The general instruction format is shown in FIG. 3 for short instructions and FIG. 4 for long instructions. In the short instructions, the high order bits 0–3 define the Operation Code, bit 4, field a, defines RAS 14 as a source or destination when zero and a special purpose register as source or destination when 1. Field b, bits 5–11, comprise the operand and when bit 4 specifies RAS 14, the format of the operand field is as shown in FIG. 5. For RAS addressing bit 5, when field d is one, specifies that the contents of XR2 register 32 are used as the low order three RAS address bits (indexing). When bit 4 specifies the RAS, field e, bit 6, is used as the high order RAS address bit (see FIG. 6). When bit 6 is a one, the next to high order bit is forced to zero. When bit 6 is a zero, it allows the BANK register 34 contents, h, to be used as the next high order RAS address bit (paging).

If bit 4 of the instruction is one, the entire seven bits (bits 5–11) of the operand field is used to designate the source or destinations depending on the instruction specified by the Op Code.

The long instructions are two ROS words long and the first word has the same format as the short instructions. The second word (see FIG. 4) utilizes bits 0 and 1 (field c) to form a branch condition code as follows:

| Code | Condition |
|---|---|
| 01 | branch on ACC ZERO |
| 10 | branch on ACC ONE |
| 11 | unconditional branch |

Bits 2–11 define the branch address.

Figures 2, 10:
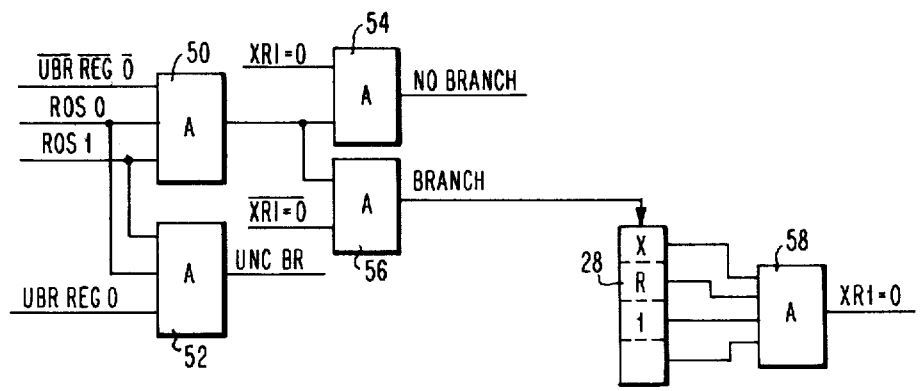
FIG. 2 is a table showing the instruction bit assignments for the instruction set for the microcomputer of FIG. 1.
FIG. 10 is a schematic block diagram showing the parts of the operation decode and execution apparatus employed in executing the branching instruction of the present invention.

FIG. 2 is a table which shows the bit assignments for the instruction set which includes the following instructions:

Op Code 0 is a short instruction LDA to load the accumulator from a source;

Op Code 1 is a short instruction AND to perform a logical AND with the contents of the accumulator and a source;

Op Code 2 is a short instruction ORA to perform a logical OR Operation with the contents of the accumulator and a source.

Op Code 3 is a short instruction OIA to perform a logical OR with the contents of the accumulator and a source and INVERT the result;

Op Code 4 is a short instruction EOR for an Exclusive OR operation with the contents of the accumulator and a source;

Op Code 5 is a long instruction EBR to Exclusive OR with the accumulator from a source and BRANCH on condition;

Op code 6 is a short instruction ADD to ADD with CARRY the contents of accumulator and a source;

Op Code 7 is a long instruction LBR to LOAD the accumulator from a source and BRANCH on condition;

Op Code 8 is a special short instruction LRI to load the index, UBR and Bank registers immediately.

Op Code 9 is a short instruction STA or STORE the contents of the accumulator at a destination;

Op Code 10 is a short instruction RST to Reset the destination to zero;

Op Code 11 is a short instruction SET to set the destination to one;

Op code 12 is a short instruction UBR to branch unconditionally. This instruction can be modified to function as a conditional branch in response to the contents of an internal register.

The unconditional branch instruction UBR is useful as a conditional branch as determined by the state of the UBR register means 30. A program to illustrate this use is as follows:

|        | LRI | LOOP COUNT |
|--------|-----|------------|
| LOOP 1 | ADD | ONE        |
|        | UBR | LOOP 1     |
|        | SET | WRAP       |

The LRI instruction, when decoded in Op register 22 will be effective to gate data over bus 26 to the internal registers as follows: The low order four bits 8–11 are used as immediate data and are loaded into index register 1 28; bit seven is loaded in UBR register 30; bit five is loaded into the BANK register 34 when bit six is a one; and when bit four is a one, Index Register 2 32 is reset. The value stored in XRI register 28 is the number of passes desired through the loop, and the value stored in UBR register 30 determines whether the branch is unconditional (if zero) or conditional (if one).

The UBR instruction is decoded in Op register means 22 and logic circuits there will produce signals based on sensing the UBR Op Code of 11 in the two high order bit positions and concurrently sensing the state of the UBR register 30. If the contents of UBR register is zero, then the branch is unconditional and the next instruction to be executed is at the branch address specified in the UBR instruction.

If the contents of UBR register is a one, the condition of XRI register is then sensed. If XRI register is zero, then no branch occurs and the next instruction to be executed is the SET instruction which is the next sequential instruction in the original instruction sequence. If the contents of XRI register are not zero, XRI is decremented and a conditional branch is executed back to the top of the loop. This operation continues until the XRI register is zero, and, when this occurs, no branch is taken and the loop is over. The state of UBR register is then reset to zero to return the unconditional branch instruction UBR to its original function.

A schematic block diagram of the parts of the operation decode and execution apparatus 22 employed in executing the branch instruction UBR is shown in FIG. 10. The apparatus comprises AND circuit 52 which produces the signal UNC BR when ROS bits one and zero are each one and UBR register 30 is zero. By reference to FIG. 2, it will be noted that the branch instruction UBR is the only instruction in which the two high order bits of the Op Code, i.e., ROS bit zero and ROS bit one, are both ones. AND circuit 52 therefore indicates a branch instruction UBR and a zero state in UBR register 30 which are the conditions for executing the UBR instruction as an unconditional branch.

AND circuit 50 produces an output when ROS bits zero and one are both one and when the UBR register 30 is not zero (the line over the signal name indicates the not condition). This output is coupled to two AND circuits 54 and 56. In AND circuit 54 the coincidental presence of the output from AND circuit 50 and the existence of a zero state in XRI register 28 produces the signal NO BRANCH. The state of register 28 is sensed by coupling the zero outputs of each stage of the register to AND circuit 58.

In case XRI register 28 is not zero when AND 50 is conditioned, the signal BRANCH is produced from AND circuit 56. This signal is also coupled to the shift input of register 28 and is operable to decrement the count then in this register which functions as a loop count during the execution of the UBR instruction.

While the invention has been particularly shown and described with reference to a preferred embodiment thereof, it will be understood by those skilled in the art that various changes in the form and details may be made therein without departing from the spirit and scope of the invention.

Having thus described our invention, what we claim as new, and desire to secure by Letters Patent is:

1. A special branch instruction execution apparatus comprising:

a source of information comprised of a sequence of signals having first or second binary states;

a stored program processor, including addressable storage for program instructions, said instructions including a special branch instruction having operation code and branch address fields;

first register means for storing information signals having first or second binary states for defining the branch mode;

second register means for storing information signals having a zero binary state or information signals having a non-zero binary state for specifying the number of passes through a loop; and instruction execution means for executing the special branch instruction, said instruction execution means comprising means for generating a first signal to unconditionally branch to the address specified in said instruction branch address field responsive to sensing the presence of said special branch instruction operation code and to sensing the presence of the first binary state of information signals in said first register means; means for generating a second signal to branch to the address specified in said instruction branch address field and to decrement the stored information signals in said second register means responsive to sensing the presence of said special branch instruction operation code, responsive to sensing the second binary state of information signals in said first register means and responsive to sensing said non-zero binary state of information signals in said second register means; and means for generating a third signal to not branch responsive to sensing the presence of said special branch instruction operation code, responsive to sensing the second binary state of information signals in said first register means and responsive to sensing a zero binary state of information signals in said second register means.

2. The apparatus according to claim 1 wherein said branch instruction and other instructions are stored in a read-only storage apparatus.

3. The apparatus according to claim 1 additionally comprising means to set data into said first and said second register means immediately prior to the execution of said branch instruction.

4. The apparatus according to claim 1 additionally comprising means to reset said first register means prior to the execution of the next sequential instruction when no branch is taken.

5. The method, in a digital computer, of branching from a first instruction sequence to a second instruction sequence comprising the steps of;
   decoding from said first instruction sequence a code indicating a branch instruction and a branch address;
   detecting the occurrence in a first register means of a first binary state of information signals;
   unconditionally branching to a second sequence of instructions specified by the branch address in response to the occurrence in said first register means of said first state;
   detecting, after the absence of the occurrence in said first register means of said first binary state, the binary state of information signals in a second register means;
   branching to a second sequence of instructions specified by the branch address and decrementing the information signals in said second register means in response to detecting the absence of the occurrence in said second register means of information signals having a zero binary state; and
   not branching in response to detecting a zero binary state in the information signals in said second register means.

6. The method of claim 5 further including the step of setting data into said first and said second register means immediately prior to execution of said branch instruction.

7. The method of claim 5 further including the step of resetting said first register means prior to the execution of the next sequential instruction in said first instruction sequence when no branch is taken.

* * * * *